(12) United States Patent  
Alameh et al.

(10) Patent No.: US 9,740,845 B2  
(45) Date of Patent: Aug. 22, 2017

(54) PRESENCE-TRIGGERED BEACON AUTHENTICATION

(71) Applicant: Motorola Mobility LLC, Chicago, IL (US)

(72) Inventors: Rachid M Alameh, Crystal Lake, IL (US); Nathan M Connell, Glenview, IL (US)

(73) Assignee: Motorola Mobility LLC, Chicago, IL (US)

( * ) Notice: Subject to any disclaimer, the term of this patent is extended or adjusted under 35 U.S.C. 154(b) by 26 days.

(21) Appl. No.: 14/616,872

(22) Filed: Feb. 9, 2015

(65) Prior Publication Data

US 2016/0232341 A1    Aug. 11, 2016

(51) Int. Cl.

| | |
|---|---|
| *H04M 1/66* | (2006.01) |
| *G06F 21/35* | (2013.01) |
| *H04W 12/06* | (2009.01) |
| *H04L 29/06* | (2006.01) |
| *H04W 12/08* | (2009.01) |

(52) U.S. Cl.
CPC .......... *G06F 21/35* (2013.01); *H04W 12/06* (2013.01); *H04L 63/0861* (2013.01); *H04W 12/08* (2013.01); *Y02B 60/50* (2013.01)

(58) Field of Classification Search
CPC ..... H04W 12/06; H04W 12/08; H04W 4/027; H04W 4/026; H04W 24/08; H04L 63/0861; G06F 21/35

USPC ......................................................... 455/411  
IPC .................... H04W 12/06,12/08, 4/027, 4/026, H04W 24/08; H04L 63/0861; G06F 21/35  
See application file for complete search history.

(56) References Cited

U.S. PATENT DOCUMENTS

2012/0264446 A1*  10/2012  Xie ........................ G01C 22/00  
                                                                455/456.1  
2014/0282877 A1*  9/2014  Mahaffey ............ H04L 63/0853  
                                                                726/3

\* cited by examiner

*Primary Examiner* — Lester Kincaid  
*Assistant Examiner* — Sayed T Zewari  
(74) *Attorney, Agent, or Firm* — Miller, Matthias & Hull LLP

(57) ABSTRACT

A system and method for authenticating a user of a device includes a user fob configured to transmit a code related to authentication, wherein the device is configured to receive the transmitted code and confirm that the holder of the fob is or is not an authorized user. In an embodiment, the device is configured to detect a user presence before checking for receipt of a transmitted code. In a further embodiment, the device is configured to emit a beacon upon detecting a user presence, prompting the user fob to transmit the code. The beacon medium may be IR (infrared), ultrasound or other low power medium, and similarly, the fob may detect the beacon and/or transmit the code in any suitable medium including IR and ultrasound.

17 Claims, 6 Drawing Sheets

PRESENCE-TRIGGERED BEACON AUTHENTICATION

TECHNICAL FIELD

The present disclosure is related generally to mobile device access, and, more particularly, to a system and method for beacon-based non-contact authentication of a user.

BACKGROUND

According to recent studies, the average owner of a portable electronic device such as a cellular phone spends more than three hours per day using the device. Moreover, these uses are no longer simply voice calls; users now plan, purchase, play, and schedule on their devices as well. Rather than slowly multitasking via several devices, or being tethered to a traditional PC platform for long periods of time, users can now quickly handle many smaller tasks on a single, high powered, portable device.

However, for reasons of power conservation and security, most portable electronic devices are configured to automatically lock or go idle after a certain period of disuse. Most portable electronic devices can also be manually put into such a state. Thus the user must unlock the device each time they wish to begin a new task or to finish a partly completed task, and each access interaction therefore imposes a time cost. The sheer number and frequency of discrete user interactions each day mean that even small access delays can accrue to cause a significant loss of productivity over the course of the user's day.

While the present disclosure is directed to a system that can eliminate some of the shortcomings noted in this Background section, it should be appreciated that any such benefit is not a limitation on the scope of the disclosed principles, nor of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
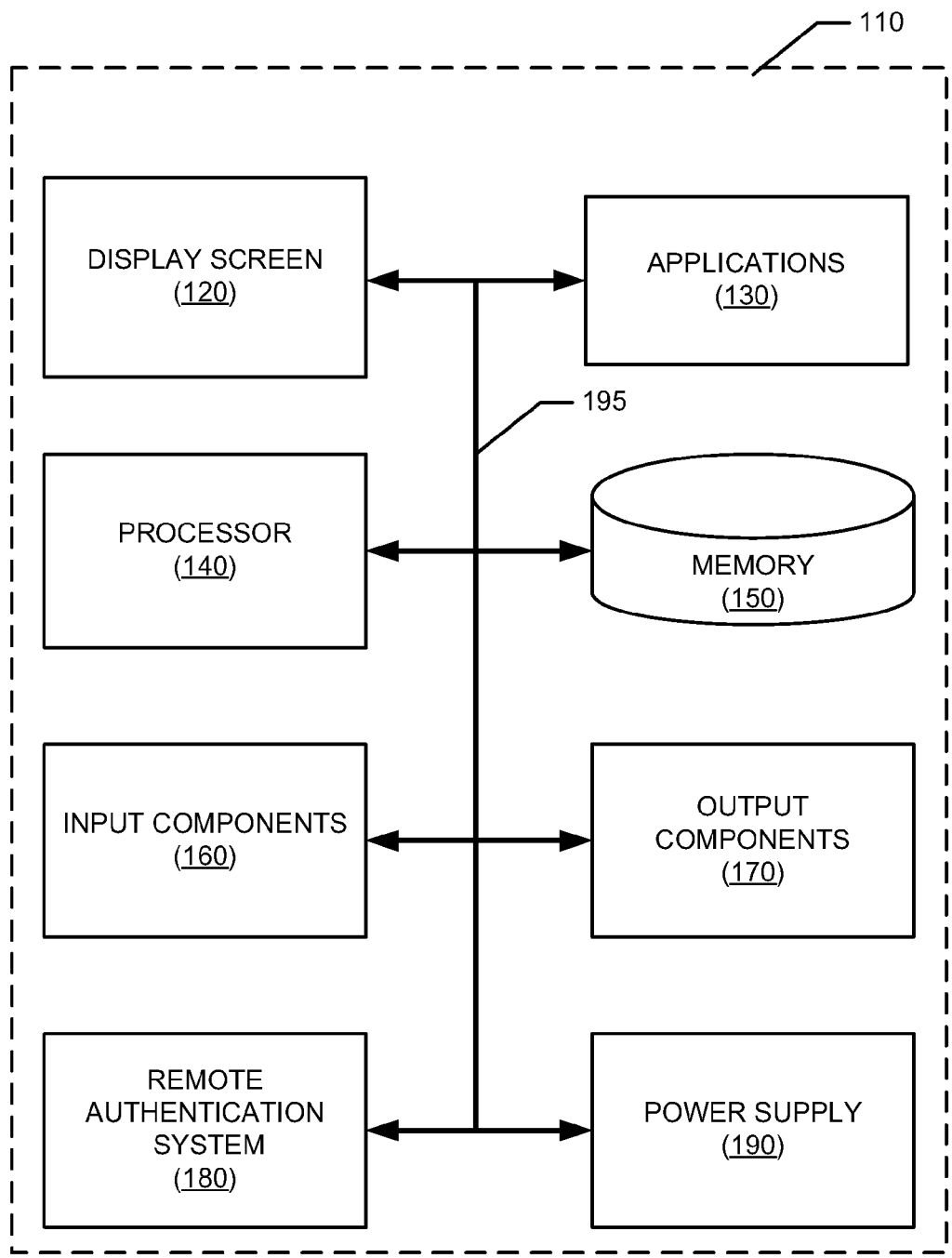
FIG. 1 is a simplified schematic of an example device with respect to which embodiments of the presently disclosed principles may be implemented.

Before presenting a detailed discussion of embodiments of the disclosed principles, an overview of certain embodiments is given to aid the reader in understanding the later discussion. As noted above, users of portable electronic devices may incur a significant cumulative time cost due to delays in accessing their device during each of many accesses per day. To reduce the time cost to the user, a device in an embodiment is constructed and configured to automatically and remotely authenticate a user as the user approaches the device. In this way, the device is immediately usable when the user physically reaches the device. At the same time, aspects of the system prevent unauthorized access by other parties.

The device according to embodiments described herein includes at least one presence sensor such as a digital output thermopile with sufficient sensitivity to detect a user heat signature within a desired range, e.g., from 0 to 10 feet away from device. The device also includes a line of sight signal sensor such as an IR (infrared) receiver, and in a further embodiment, the device further includes a signal transmitting device such as one or more IR LEDs. Device users carry a small keychain fob or pendant, configured to pulse a user ID code for user authentication.

When a user presence is detected via the digital output thermopile or other low power sensor, an authentication process is begun. In particular, the device activates the line of sight signal sensor (e.g., IR receiver located in the device). In an embodiment, the user fob is configured to periodically transmit the user ID code (e.g., transmitting a 10 microsecond code every 5 seconds). When the user having the fob is detected and the IR receiver activated, the receiver receives an instance of the periodically transmitted code, which the device then processes to determine user authentication. If the determined user is an authorized user, the device allows access.

In an alternative embodiment, the user fob does not periodically transmit the user ID code. Instead, the user fob contains both an IR LED and an IR receiver. In this embodiment, when a user presence is detected via the digital output thermopile, for example, the device transmits a simple IR beacon from the device toward the user fob. When the IR receiver of the user fob detects such a beacon, it pulses out the user unique ID code via the IR LED of the fob. In this embodiment, the fob need not transmit until it detects the beacon. Instead, it can power the IR receiver continuously or periodically, but power the IR LED only when prompted by the beacon.

In either embodiment, the short range and essentially line of sight character of the code transmission aids in maintaining security. While an IR signal is the primary example of such a transmission, it will be appreciated that other limited range technologies such as ultrasound may alternatively be used. Once the device grants access, it may simply allow access or may also provide the user with timely information that requires authorization to access, e.g., by displaying the fact and content of unread messages. In an embodiment, when a user is detected but not yet authorized, the device may display a notification of unread messages, without conveying the substance of the messages or otherwise giving access to the device.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, personal computers, embedded automobile computing systems and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as speech and text input facilities, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file system service and handling of protected and unprotected data stored in the memory 150. Although many applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

Although not shown, the device 110 may include software and hardware networking components to allow communications to and from the device. Such networking components will typically provide wireless networking functionality, although wired networking may additionally or alternatively be supported.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

In an embodiment of the disclosed principles, the illustrated device 110 also includes a remote authentication system 180 equipped and configured to automatically and touchlessly detect a user and provide access if the user is authorized, e.g., if the user has a fob configured to interact with the device and transmit a correct user ID code. To accomplish automatic remote authentication, the remote authentication system 180 includes certain subsystems and components, as will be described in greater detail below during the discussion of FIG. 2.

Figure 2:
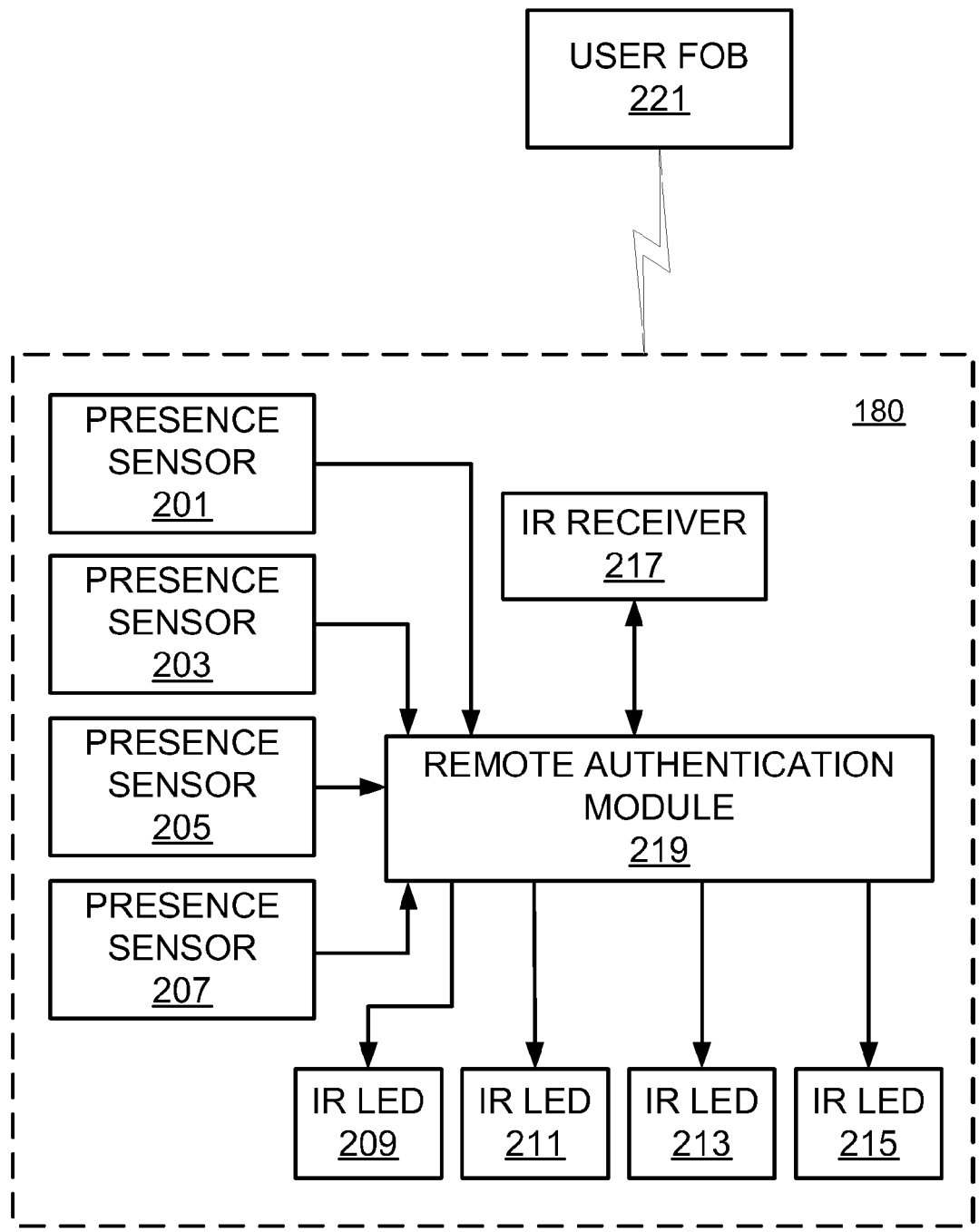
FIG. 2 is a modular schematic of the device of FIG. 1 and an associated user fob for implementing embodiments of the presently disclosed principles.

Turning to FIG. 2, an example remote authentication system 180 of the portable electronic device 110 is shown. In the illustrated example, the remote authentication system 180 includes one or more presence sensors 201, 203, 205, 207. The presence sensors 201, 203, 205, 207 may be of any suitable type, but in an embodiment, the presence sensors 201, 203, 205, 207 are noncontact sensors configured to respond to a nearby heat source or presence by providing a signal indicative of a thermal (hot or cold) signature of heat or other indicator emitted by the source.

An example of a suitable noncontact sensor is a digital output thermopile. This type of sensor includes a silicon-based thermopile chip with a number of thermoelements. Thermoelements are referred to as thermo junctions. A thermojunction consists of dissimilar metals or conductors that touch at a point. When subjected to heat they generate voltage across the dissimilar materials. To generate sufficient voltage for detection, a number of thermojunctions may be wired in series, with the group of thermoelements being referred to as a thermo pile. Amplification is added to achieve a digital output. This is referred to as a digital output thermopile. While an analog output thermo pile can be interfaced with AD converter to generate a digital output, use of a digital output thermopile provides improved device integration and lower complexity.

The example remote authentication system 180 also includes one or more IR LEDs 209, 211, 213, 215 for transmitting a beacon upon detection of a user presence. In addition, the illustrated remote authentication system 180 includes an IR receiver 217 for receiving a code transmitted by a user fob 221.

The presence sensors 201, 203, 205, 207 and IR LEDS 209, 211, 213, 215 are monitored and controlled by a remote authentication module 219 within the remote authentication system 180. In operational overview, the remote authentication module 219 receives the output of each presence sensor 201, 203, 205, 207 and processes the output to determine whether a person is likely to be nearby.

The precise procedure used in a given implementation to convert thermal data to a presence determination is not critical. An example presence detection procedure assumes a person is likely to be present if the maximum thermal signal, average thermal signal, or other measure based on the presence sensors 201, 203, 205, 207 exceeds a predetermined threshold. However, any other suitable mechanism may be used. If a person is likely to be present based on the presence sensor data, the remote authentication detection module 219 transmits a beacon via the one or more IR LEDS 209, 211, 213, 215. The beacon may be in the form of a pulse, pulse train, broad spectrum burst, encoded value or data, or other form.

Figure 3:
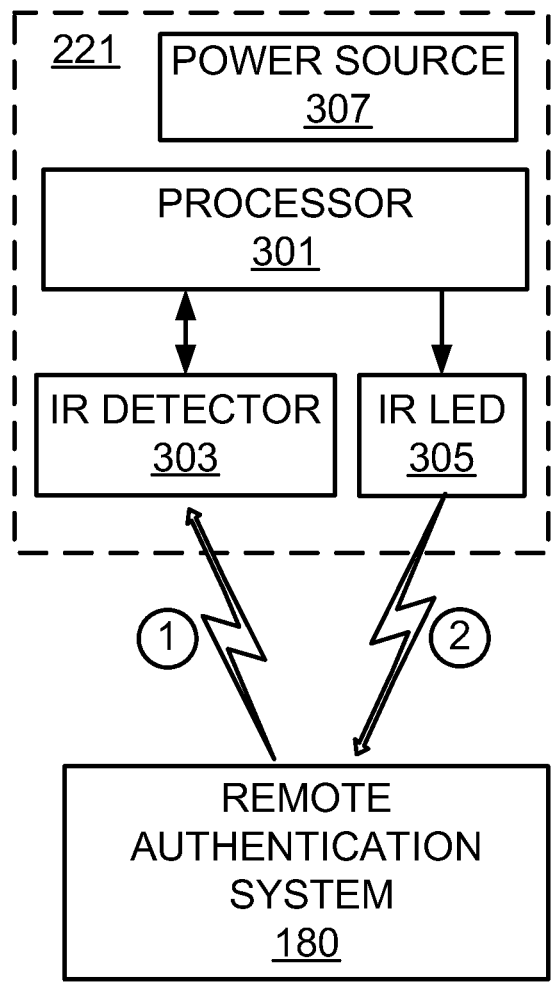
FIG. 3 is a modular schematic of the user fob of FIG. 2, within which embodiments of the disclosed principles may be implemented.

The user fob 221 is shown in schematic form in FIG. 3. An alternative to the embodiment shown in FIG. 3 is a simple transmission-only beacon, i.e., with no receiver, wherein the fob is preprogrammed with a unique code. In the illustrated embodiment, the user fob 221 contains a fob processor 301 which may be a microcontroller, microprocessor or simple decision circuit configured to provide the fob's beacon detection and code transmission functions. With respect to these functions, the user fob 221 further includes an IR receiver 303 or other signal detector and an IR LED 305 or other signal transmission mechanism. A power source 307 such as a battery or fuel cell provides power to the processor 301, the IR receiver 303 and the IR LED 305.

Figure 4:
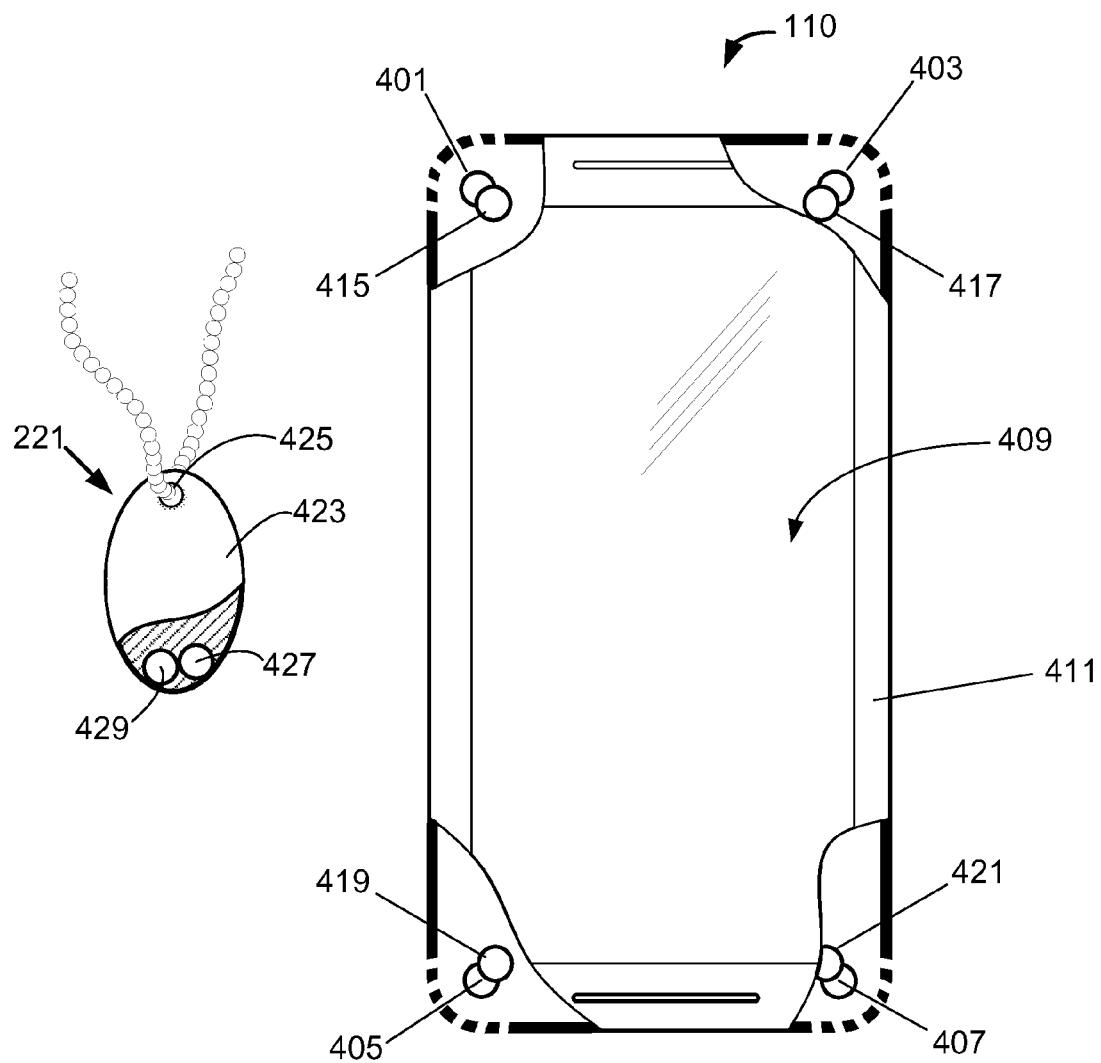
FIG. 4 is a partially cut away frontal view of the device of FIGS. 1 and 2 and the user fob of FIG. 3, in an implementation of embodiments of the disclosed principles may be implemented.

While various physical configurations of the described components are possible, an example physical configuration is shown in FIG. 4, in a partial cut away view. In the illustrated example, the electronic device 110 is of a rectangular planform and the fob 221 is generally rounded, e.g., circular or elliptical. Before continuing, it should be noted that the illustrated shapes are given as examples, and any other suitable shape or physical layout may be used instead for either device.

In the view shown, the front of the electronic device 110 is visible, including a user interface screen 409. The user interface screen 409 may be the display screen 120 discussed with reference to FIG. 1, or in the alternative, multiple screens may be used.

The user interface screen 409 is enclosed by or affixed to a housing 411. In an embodiment, the housing 411 contains the components of the electronic device 110 as described by reference to FIGS. 1 and 2, as well as optional components or alternative components.

A number of presence sensors 401, 403, 405, 407 (corresponding, for example, to presence sensors 201, 203, 205, 207 of FIG. 2) are positioned within the housing 411, and generally beyond the periphery of the user interface screen 409. In this context, the presence being sensed is a user presence in the vicinity of device, whether the user is stationary or moving. Presence can be sensed via thermal or non-thermal means (e.g., ultrasonic, RF, Imager, radar/time of flight systems, etc.) To simplify viewing of the placement of the presence sensors 401, 403, 405, 407 in the illustrated example, the interface screen 409 and housing 411 are shown partially cut away in those areas. In the illustrated example, the lateral edges of the housing 411 are perforated by slots at the corners to admit IR radiation from heat sources and allow the outputs of the presence sensors 401, 403, 405, 407 to be processed to yield motion, direction and location information regarding a heat source.

In addition to the presence sensors 401, 403, 405, 407, the device 110 includes one or more IR LEDs 415, 417, 419, 421, e.g., corresponding to IR LEDs 209, 211, 213, 215 of FIG. 2, for transmitting a beacon upon detection of a user presence.

The fob 221 has a housing 423, which may include a through hole 425 or other attachment mechanism for attaching the fob 221 to a chain, clip, wire or other retention means. In an embodiment, the attachment mechanism includes an integral clip, e.g., a spring-loaded alligator type clip, for attachment to the edge of a thin surface, e.g., a user pocket, shirt sleeve or other clothing location or item. The alligator type clip may be formed or attached as part of the housing 423, or may be attached to the housing 423 via a cable such as a retracting cable.

As noted with respect to FIG. 3, the fob 221 comprises an IR receiver 427 (303) or other signal detector and an IR LED 429 (305) or other signal transmission mechanism. These elements may be located such that they have access to the ambient environment, e.g., through an edge or surface of the fob housing 423. As noted above, the fob 221 need not include an IR receiver 427 in all embodiments, since in some embodiments the fob 221 periodically transmits the string-code regardless of whether the fob 221 is close enough to the electronic device 110 for the device 110 to sense the user.

Figure 5:
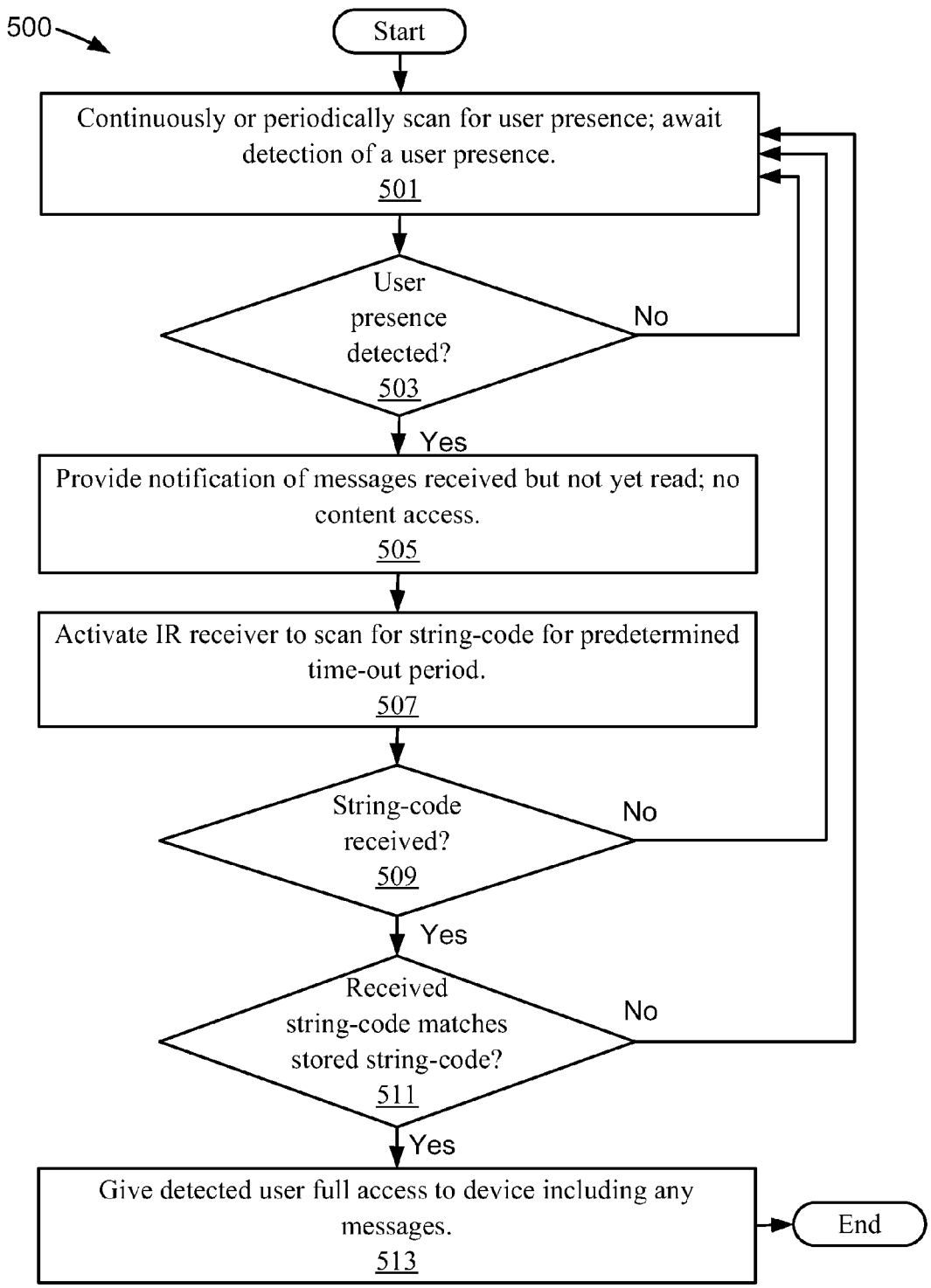
FIG. 5 is a flowchart showing an example process of providing user authentication within an embodiment of the described principles.
Figure 6:
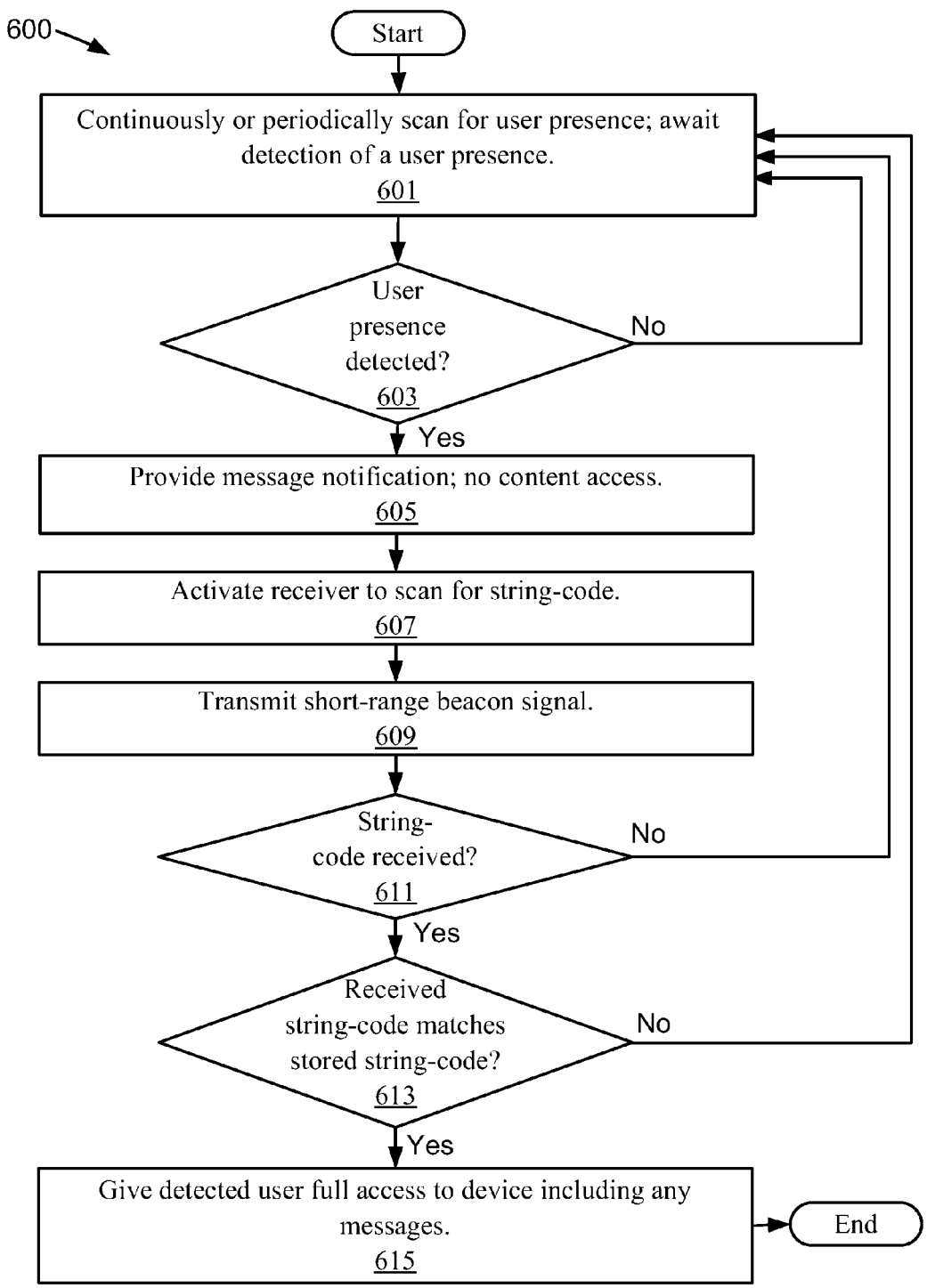
FIG. 6 is a flowchart showing an example process of providing user authentication within an alternative embodiment of the described principles.

With respect to the operational flowcharts, each class of operation will be shown separately. In particular, FIG. 5 illustrates a process 500 wherein the fob 221 is configured to periodically transmit the string code via IR or ultrasound regardless of presence detection, whereas FIG. 6 illustrates a process 600 wherein the fob 221 is configured to transmit the string code via IR or ultrasound only when a device beacon is sensed. In the first scenario, the fob 221 need only include a signal transmitter, no receiver, and the device 110 need only include a receiver (no transmitter). In the latter case, the fob 221 includes both a transmitter and receiver, as does the device 110.

Turning to FIG. 5, the process 500 begins at stage 501, wherein the device 110 continuously or periodically scans for a user presence, e.g., via a thermal sensor 401, 403, 405, 407 and awaits detection of a user presence. If it is determined at stage 503 that a user is not present, the process returns to stage 501 to continue to await such detection. If instead it is determined at stage 503 that a user is present, the process proceeds to stage 505, wherein the device 110 displays or otherwise conveys a notification of any messages that have been received at the device but not yet read, without allowing access to any message content. At stage 507, the device 110 activates an IR receiver and scans for a string-code for a predetermined time-out period.

If it is determined at stage 509 that a string-code has not been received within the time-out period, the process 500 returns to stage 501. If instead a string-code has been received within the time-out period, the process 500 flows to stage 511, wherein the device 110 compares the received string-code to a stored string code associated with an authorized user of the device 110. If the received string-code does not correspond to the stored string code, the process 500 returns to stage 501. Otherwise, if the received string-code corresponds to the stored string code, the process 500 flows to stage 513 wherein the device 110 allows the detected user full access to the device 110 including any messages.

As noted above, in an embodiment, the fob 221 includes a "prox"; that is, a signal transmitter and a signal receiver. In the illustrated examples of FIGS. 2-4, the receiver and transmitter are IR-based, although it will be appreciated that any other suitable signaling medium may be used, e.g., ultrasound.

An exemplary process for user detection and authorization in this embodiment is shown in FIG. 6. Turning to FIG. 6, the process 600 begins at stage 601, wherein the device 110 continuously or periodically scans for a user presence, e.g., via a thermal sensor 401, 403, 405, 407 and awaits detection of a user presence. If it is determined at stage 603 that a user is not present, the process returns to stage 601 to continue to await such detection. If instead it is determined at stage 603 that a user is present, the process proceeds to stage 605, wherein the device 110 displays or otherwise conveys a notification of any messages that have been received at the device but not yet read, without allowing access to any message content. In an embodiment, stage 605 may be omitted, and the preview of messages may be limited in content in some embodiments.

At stage 607 the device 110 activates a signal receiver such as an IR receiver to scan over a predetermined time-out period for a string-code. Meanwhile, the device 110 transmits a short-range beacon signal, e.g., via IR or ultrasound, at stage 609. If it is determined at stage 611 that a string-code has not been received within the time-out period, the process 600 returns to stage 601. If instead a string-code has been received within the time-out period, the process 600 flows to stage 613, wherein the device 110 compares the received string-code to a stored string code associated with an authorized user of the device 110. If the received string-code does not correspond to the stored string code, the process 600 returns to stage 601. Otherwise, if the received string-code corresponds to the stored string code, the process 600 flows to stage 615 wherein the device 110 allows the detected user full access to the device 110 including any messages.

It will be appreciated that various systems and processes for user authentication have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A beacon-authenticated electronic device associated with a device user, the device comprising:
   a device housing;
   a thermal sensor at least partially within the device housing;
   a non-thermal signal detection system; and
   a device controller configured to authenticate the device user when the device is locked by, in order, sensing a human presence via the thermal sensor and based on sensing the human presence, activating the non-thermal signal detection system, detecting a non-thermal beacon via the non-thermal signal detection system, wherein the beacon contains an authentication string-code, determining whether the embedded authentication string-code is associated with the device user, and allowing the user access to the device when the authentication string-code is determined to be associated with the device user, and otherwise maintaining the device in the locked state.

2. The beacon-authenticated electronic device in accordance with claim 1, wherein the device controller is further configured to generate a notification of previously received but held messages without granting access to the previously received but held messages when a presence is sensed via the thermal sensor, and to allow access to the previously received but held messages when the authentication string-code is determined to be associated with the device user.

3. The beacon-authenticated electronic device in accordance with claim 1, wherein the non-thermal beacon comprises at least one of an infrared (IR) signal and an ultrasound signal.

4. The beacon-authenticated electronic device in accordance with claim 1, wherein the device controller is further configured to activate the non-thermal signal detection system embedded in the device along with the thermal sensor upon sensing a presence via the thermal sensor.

5. The beacon-authenticated electronic device in accordance with claim 1, wherein the non-thermal signal detection system comprises an IR receiver located in the device.

6. The beacon-authenticated electronic device in accordance with claim 1, further comprising at least one non-thermal signaling element, and wherein the device controller is further configured to transmit a contact beacon from the at least one non-thermal signaling element located in the device upon sensing a presence via the thermal sensor.

7. The beacon-authenticated electronic device in accordance with claim 6, wherein the at least one non-thermal signaling element comprises an IR light emitting diode.

8. A beacon-based system for presence-based authentication comprising:
   a thermal sensor;
   a non-thermal sensor; and
   a controller communicably linked to the thermal sensor and non-thermal sensor, configured to allow a user to access a locked electronic device by, in order, sensing a human presence via the thermal sensor, activating the non-thermal sensor based on sensing a human presence, detecting a non-thermal beacon via the non-thermal sensor, wherein the beacon contains an authentication string-code, determining whether the authentication string-code is associated with the user, and unlocking the electronic device when the authentication string-code is associated with the user.

9. The beacon-based system in accordance with claim 8, wherein the controller is further configured to generate a notification at the electronic device of previously received but held messages after unlocking the electronic device.

10. The beacon-based system in accordance with claim 8, wherein the non-thermal beacon is one of an infrared (IR) signal and an ultrasound signal.

11. The beacon-based system in accordance with claim 8, wherein the non-thermal sensor comprises an IR receiver.

12. The beacon-based system in accordance with claim 8, further comprising at least one non-thermal signaling element, and wherein the controller is further configured to transmit a contact beacon from the at least one non-thermal signaling element upon sensing a presence via the thermal sensor.

13. The beacon-based system in accordance with claim 12, wherein the at least one non-thermal signaling element comprises an IR light emitting diode.

14. A method for unlocking an electronic device comprising, in order:
- detecting a presence of a person with a first sensor;
- in response to detecting the presence of the person, activating a second sensor of a different type than the first sensor;
- identifying user-specific information using the second sensor; and
- unlocking the electronic device if the user-specific information matches an authorized user of the device
- wherein the first sensor is a thermal sensor capable of detecting body heat,
- wherein the second sensor is one of an infrared (IR) receiver and an ultrasonic sensor.

15. The method in accordance with claim 14, further comprising generating a notification to the authorized user regarding previously received but held messages after unlocking the electronic device.

16. The method in accordance with claim 14, further comprising transmitting a contact beacon from the electronic device after detecting the presence of a person.

17. The method in accordance with claim 16, wherein the contact beacon is an IR beacon.

* * * * *